United States Patent [19]

Mateja et al.

[11] 4,363,950
[45] Dec. 14, 1982

[54] ARRANGEMENT FOR ELECTROSPARK WORKING OF INTERNAL CONICAL SURFACES OF METAL PARTS

[75] Inventors: Ludvík Mateja; Josef Prašek, both of Velké Meziříčí, Czechoslovakia

[73] Assignee: Motor Jihlava narodni podnik, Jihlava, Czechoslovakia

[21] Appl. No.: 213,169

[22] Filed: Dec. 4, 1980

[30] Foreign Application Priority Data

Dec. 5, 1979 [CS] Czechoslovakia ............... 8427-79

[51] Int. Cl.³ .............................................. B23P 1/12
[52] U.S. Cl. ................................................. 219/69 R
[58] Field of Search ................ 219/69 R, 69 E, 69 G, 219/69 M

[56] References Cited

U.S. PATENT DOCUMENTS 3,318,793  5/1967  Webb ...................... 219/69 G X
3,604,884  9/1971  Olsson ....................... 219/69 G Primary Examiner—A. T. Grimley
Assistant Examiner—D. A. Tone

[57] ABSTRACT

Arrangement for the electrospark working of internal conical surfaces of metal parts having a hollow space with a high slenderness ratio, terminating in a conical surface. The working electrode is guided in the hollow space of the workpiece and is provided with a simple and effective system of advance of the electrode, with the possibility of stoppage of the operation of the apparatus if due to some non-conductive dirt between the electrode and the worked surface correct operation is impossible, and with the provision of effective rinsing of the burning products.

4 Claims, 1 Drawing Figure

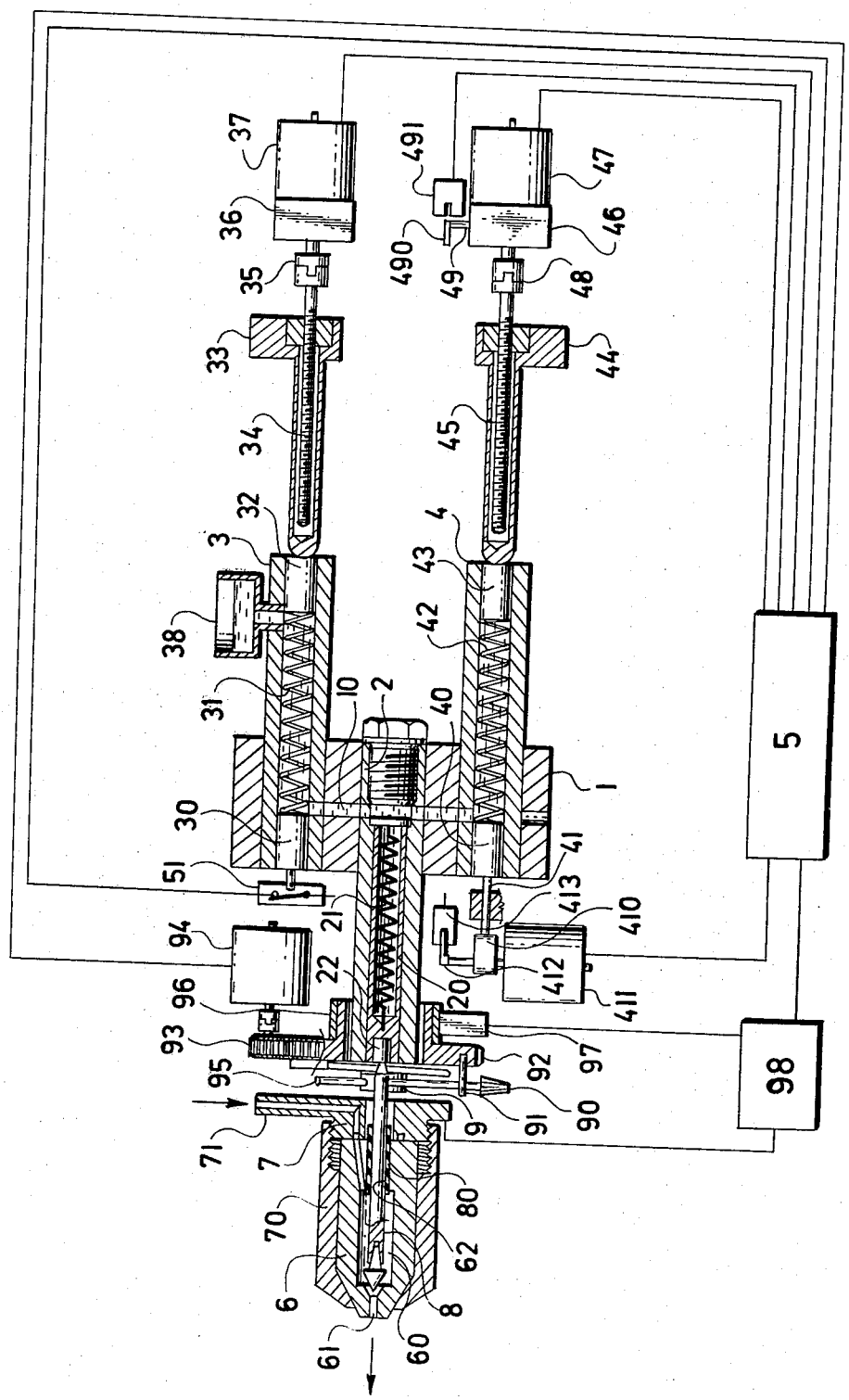

ARRANGEMENT FOR ELECTROSPARK WORKING OF INTERNAL CONICAL SURFACES OF METAL PARTS

This application is related to the coassigned application of Mateja et al., Ser. No. 213,168 filed contemporareously herewith.

BACKGROUND OF THE INVENTION

The invention relates to an arrangement for working (finishing) internal conical surfaces of metal parts having a hollow space with a high slenderness ratio, which hollow space is a cylindrical surface terminating in an inner coaxial conical surface. For the working in accordance with the invention, there is employed an electrode which is connected to one pole of a source of burning electrical impulses and the electrode, which terminates in a conical burning part, is provided with a guiding part insulated from the electrode and inserted in a guiding means for the electrode formed by a cylindrical surface of the hollow space of the workpiece. The workpiece is connected to the second pole of the source of burning electrical impulses. The electrode is in engagement with means for rotating it and also with means for its quick and/or microadvance with respect to the workpiece.

The accurate working (finishing) of internal conical surfaces terminating a hollow space of a metal workpiece having a high slenderness ratio, for instance the grinding of seats of some fuel injection bodies of Diesel engines, presents substantial difficulties.

A number of methods for the working of internal conical surfaces of workpieces of this kind are known, but all of them are either so costly or not sufficiently precise. A method called abrasive technology is for instance known. In this method a small grinding disk rotating at a high speed on the order of 70,000 rpm is used. The active part of the grinding disk is conical and is in contact with the ground conical surface, performing in addition to the mentioned rotational motion a straight line reciprocal motion in the direction of a geometrical element of the ground conical surface.

This grinding method requires means for generating high speed revolutions, which presents substantial problems at the required accuracy of grinding. It requires high grade and accurate grinding disks and also entails certain risks from the point of view of the safety of the operator. It is rather demanding on the operator or operators—particularly from the point of view of adjustment and of maintenance, since the high speed spindles used have a short lifetime. Another substantial drawback exists in addition to these unfavorable conditions, namely that this method cannot be practically applied in the accurate grinding of internal conical surfaces having a slenderness ratio higher than 1:8. Under these conditions this described method fails since, due to the use of relatively long spindles, not only problems arise with their supporting and driving at high speed, but also unwelcomed deformations of the spindles take place and thus there result imperfections of the required geometry of the conical surface.

Another known method uses the electroerosive principle in which working of conical surfaces proceeds by means of a wire electrode, wherein the workpiece rotates and the electrode performs a reciprocal motion, again in the direction of an element of the conical surface. A drawback of this method is that it cannot operate reliably even with a slenderness ratio of 1:6 due to lack of space, particularly also because of the springing and permanent deformation of the electrode, because of difficulties of adjustment, and extraordinary demands on the operators. As a result, there are imperfections in the required geometry of the ground surface.

An arrangement for working internal conical surfaces of metal workpieces with a hollow space having a high slenderness ratio is known. In such arrangement, the hollow space is a coaxial cylindrical surface terminating in a conical surface, and the working is performed by an electrode connected to a source of burning electrical impulses, and the electrode, the shaft of which terminates in a conical burning surface, is provided with a guiding part insulated from the shaft and is inserted in a means for guiding the electrode. Such grinding means is formed by a cylindrical surface of the hollow space of the workpiece. The workpiece is clamped in a workpiece fixture, which is connected to one pole and the electrode shaft is connected to the other pole of a source of burning electrical impulses. On a vertically slidable bridge, which is in engagement with a device for quick advance of the spindle, there are provided a drive for the rotation of the electrode and a driving source for its microadvance. It has been found that this arrangement, although it represented a substantial improvement for working internal conical surfaces of metal workpieces of this kind, is relatively complicated so far as the provision of quick and microadvance of the spindle is concerned, and furthermore that it does not permit an instantaneous stoppage in those cases wherein no electrical connection of the electrode with the worked conical surface takes place due to the presence of electrically non-conductive dirt between the electrode and the worked surface. It has been also found that the rinsing system, i.e. the removal of burning products, requires improvement.

SUMMARY OF THE INVENTION

It is an object of this invention to remove these drawbacks and to provide an arrangement with a relatively simple but reliable system for generating quick and microadvance, with the possibility of stoppage when, due to the presence of dirt between the electrode and the worked surface, correct operation of the electrode is not possible, and furthermore to provide improvements in the rinsing system.

According to this invention a hydraulic working cylinder, a hydraulic cylinder for quick advance, and a hydraulic cylinder for microadvance are fixed on a holder, said cylinders being all interconnected; a supporting piston, against which the electrode bears, is provided in the working cylinder. A piston is provided in the cylinder for quick advance, against which a nut bears, the nut being threaded upon a screw bolt of the drive for quick advance. A second piston is provided in the hydraulic cylinder for microadvance, against which a nut bears, the nut being threaded upon a screw bolt of the drive for microadvance. Compression springs are provided in the hydraulic cylinder for quick advance and in the hydraulic cylinder for microadvance, and a tension spring is provided in the hydraulic working cylinder.

From the point of view of security against overloading and the provision of an effective rinsing of products of electric erosion, an arrangement is advantageous wherein—while a safety piston is provided opposite to the piston of the hydraulic cylinder for quick advance, opposite to which piston a circuit breaker is provided—on the opposite side of the piston of the cylinder for microadvance a rinsing piston is provided, against which there bears a rod which is in contact with a cam of an electric motor.

It is also advantageous for a good performance of the arrangement to connect the space of the hydraulic cylinder for quick advance in the idle position of its piston with a replenishing tank.

A saving of copper can be achieved according to this invention if the electrode is formed by a steel shaft, into which a conical burning part made of copper is inserted.

DESCRIPTION OF THE DRAWING

An exemplary embodiment of this invention is illustrated in the accompanying drawing, wherein:

The single FIGURE of the drawing schematically illustrates a preferred embodiment partially in elevation and partially in longitudinal section.

DESCRIPTION OF PREFERRED EMBODIMENT

A first, working hydraulic cylinder 2, is mounted on a holder 1 fixed to the frame (not shown) of the machine, there being a second hydraulic cylinder 3 for quick advance and a third hydraulic cylinder 4 for microadvance fixed to the holder 1 on opposite sides of the cylinder 2. The hydraulic cylinder 3 for quick advance is closed at its left end by a safety piston 30 opposite to which there is mounted a circuit breaker 51 of a control device 5 which is adapted to be programmed. A coil compression spring 31 and a piston 32, against which a nut 33 threadedly mounted upon a screw bolt 34 bears, are disposed in cylinder 3. The nut 33 is mounted against turning as it travels in either direction along the screw bolt 34. The screw bolt 34 is turned by a first, reversible electric motor 37 for quick advance, motor 37 being connected to the control device 5. The space within the hydraulic cylinder 3 for quick advance inwardly of the piston 32 is connected to a fluid replenishing tank 38.

A coiled compression spring 42 is provided within the hydraulic cylinder 4 for microadvance, spring 42 bearing against a piston 43 within the cylinder, a second nut 44 threadedly mounted upon a second bolt 45 bearing against the outer end of the piston 42. The screw bolt 45 is driven by a second reversible electric motor 47 through a coupling 48 in the same manner in which the motor 37 is connected to the screw bolt 34 by the coupling 35. The second nut 44 is also secured against turning as it travels in either direction along the screw bolt 45.

The hydraulic cylinder 4 for microadvance is closed at its left-hand end by a rinsing piston 40, opposite to which there is slidably arranged a rod 41 which bears against a cam 410 on the shaft of a third electric motor 411. The motor 411 is connected to the programmable control device 5. The left-hand terminal position of the rod 41 is secured by a lever 412, which bears against a stop 413.

Each of the electric motors 37 and 47 is a geared motor, motor 37 having gearing 36 and motor 47 having gearing 46; gearing 46 has an outgoing shaft 49 terminating in a small shaft 490 cooperating with a contactless switch 491 which provides information about the movement of the piston 43 in the microadvance cylinder 4 with an accuracy of 0.01 mm.

The spaces within the hydraulic cylinder 3 for quick advance, within the hydraulic cylinder 4 for microadvance, and within the working hydraulic cylinder 2 are mutually interconnected by a channel 10.

A piston 20 is disposed in the working cylinder 2, such piston having a central bore in which there is disposed a tension spring 21 which constantly urges the piston 20 to the left. The piston 20 is provided at its left-hand front face with a central stop member 22 made of hard metal.

The workpiece 6 to be worked, in this case the nozzle of an injector of a Diesel engine, is fixedly mounted upon a workpiece-holding fixture 7 by a nut 70. The workpiece fixture 7 is provided with a bore 71 for supplying liquid to the hollow space 60 of the workpiece 6, the workpiece 6 having a concentric opening 61 at its left-hand end for the removal of such liquid.

The electrode 8 has a steel shaft terminating in a forward, left-hand conical burning part made of copper, the shape of which corresponds to the desired resulting conical surface between the concentric opening 61 and the hollow space 60 which is to be worked by electrospark working. Such forward end portion of the electrode passes without contact through the workpiece fixture 7. The guiding part of the electrode 8, i.e., a part of the surface of the steel shaft, is provided with an electrically insulating sleeve 80 by means of the cylindrical surface of which the electrode 8 is actively guided in the cylindrical space 62 of the workpiece 6.

The clamping dog 9 with a clamping screw 90 rests against the carrier bolt 91 of a gear 92, gear 92 being in mesh with a pinion 93 which is driven by an electric motor 94 through a flexible coupling, as shown. It will be seen that motor 94 acting through pinion 93 and gear 92 rotate the electrode 8 in its operation.

The clamping dog 9 is electrically and mechanically connected to a gear 92 by means of a spring 95 which by its force urges the electrode 8 against the stop 22 and at the same time forms an electrically reliable contact between the electrode 8 and the gear 92. The collar of gear 92 is provided with a copper slip ring 96, against which a carbon brush 97 is pressed, the brush being connected to the negative pole of a source 98 of burning electrical impulses. The positive pole of the electric source 98 of burning impulses is electrically connected to the workpiece fixture 7 and thus also to the workpiece 6. The source 98 of electric burning impulses is connected to the control device 5, as shown.

The above-described arrangement operates as follows:

The electrode 8 is inserted into the workpiece 6, which is clamped to the workpiece fixture 7 by means of the nut 70. The clamping dog 9 is affixed to the protruding right-hand end of electrode shaft 8. The working program is adjusted on a control device 5, i.e., the burning conditions: the common intensity, the burning lamps, the frequency of pulses, the speed of the quick and microadvance, and the like.

After the apparatus has been started, the quick starts to flow from a pump (not shown) through the bore 71 into the hollow space 60 of the workpiece 5. As a consequence thereof, the electrode 8 is urged in cooperation with the spring 95 against the stop 22. Thereafter, the quick advance is started, and after the piston 32 has closed the connection with the replenishing tank 38, the proper quick advance of the electrode 8 is started, i.e., its accelerated approaching to the surface of the workpiece 6 to be worked.

As soon as, due to this movement, the first contact of the copper burning part of the electrode with the surface of the workpiece 6 to be worked is established, a short time reversal of the electric motor 37 for quick advance takes place, the electrode 8 is removed from such surface of the workpiece 6, and the thus originating interruption of the electric current forms an impulse both for turning the electrode 8 by the electric motor 94 at a chosen speed of rotation, and for starting the electric motor 47, i.e., the introduction of the microadvance of the electrode 8 under prior chosen conditions.

The wing 490 and the limit switch 491 permit at chosen intervals, for instance after achieving each 0.02 mm of burning-off of the electrode 8, and efficient rinsing, i.e. removal of burning products in the workpiece 6. This is accomplished by a programmed short time starting of the electric motor 411 whereby the cam 410 acting through the rod 41 shifts the rinsing piston 40 for a short time to the left and then back again. In consequence of this, a sudden shifting of the electrode 8 from the worked surface of the workpiece 6 takes place, and the liquid can then remove the burning products from the workpiece at an increased rate.

After a prior adjusted extent of working has been achieved, the described arrangement is automatically stopped, and the micro and quick advances, i.e., the means for their generating, are displaced to their starting positions, wherein after removal of the finely worked workpiece and the clamping of a new workpiece 6, the described cycle is repeated.

In case the situation arises upon the starting of the machine, and possibly also in the course of working the workpiece, wherein there is no electrically conductive contact of the electrode with the work surface, so that no spark discharges take place between them, the pressure in the hydraulic cylinders 2, 3 and 4 would rise to such a value that there could be the danger of damage of the described arrangement. In order to prevent this, after such limit pressure value has been reached and/or surpassed in the hydraulic cylinders 2, 3 and 4, the safety piston 30 is actuated so as to stop operation of the arrangement instantaneously by means of operating the circuit breaker 51.

The adjustment of pressure which this switching-off has accomplished can be advantageously achieved by suitable arrangement of a safety piston, preferably by adjusting means acting upon a spring (not shown) which can be adjusted so as to vary the force with which it opposes the movement of the safety piston 30.

Although the invention is illustrated and described with reference to one preferred embodiment thereof, it is to be expressly understood that it is in no way limited to the disclosure of such preferred embodiments, but is capable of numerous modifications within the scope of the appended claims.

We claim:

1. In an arrangement for the electrospark erosive working of internal conical surfaces of metal workpieces having a hollow space with a high slenderness ratio, the hollow space being bounded by a cylindrical surface terminating in a conical surface coaxial therewith, the arrangement having an electrode for performing the working, a source of burning electrical impulses, means connecting said electrode to a first pole of such electrical source, the electrode terminating in a conical burning part and being provided with a shaft insulated from the workpiece, guiding means for the shaft of the electrode provided in the hollow cylindrical surface bounding the hollow space of the workpiece, means connecting the workpiece to the second pole of the source of burning electrical impulses, means for rotating the electrode, and means providing for a quick and a microadvance of the electrode relative to the workpiece, the improvement which comprises a holder, a first, hydraulic working cylinder, a second, hydraulic cylinder for a quick advance, and a third, hydraulic cylinder for the microadvance of the electrode, said second and third hydraulic cylinders being supported by the holder, conduit means interconnecting all of said hydraulic cylinders, a supporting piston slidably arranged in the first, hydraulic working cylinder, the electrode resting against this supporting piston, a second piston slidably arranged in the second hydraulic cylinder, a first drive for the quick advance, a third piston slidably arranged in the third hydraulic cylinder, a second drive for the microadvance, compression springs provided in both cylinders for quick and microadvance, and a tension spring provided in the first, hydraulic working cylinder.

2. The arrangement according to claim 1, wherein the first drive, for the quick advance, comprises a first screw bolt receiving a rotating motion from said first drive, a first nut on said first screw bolt adapted to be shifted along the first screw bolt while being prevented from turning, and the second drive, for the microadvance, comprises a second screw bolt receiving a rotating motion from said second drive, a second nut on said second screw bolt adapted to be shifted along said second screw bolt while being prevented from turning, said first nut resting against the piston of the second hydraulic cylinder for quick advance, and the second nut resting against the piston of the third hydraulic cylinder for microadvance.

3. An arrangement as claimed in claim 2, comprising a safety piston provided in the second hydraulic cylinder for quick advance opposite to the piston of this cylinder, a circuit breaker adapted to be actuated by this safety piston, a rinsing piston provided in the third hydraulic cylinder for microadvance opposite to the third piston in such cylinder, a rod resting against the rinsing piston, a control device which is adapted to be programmed, an electric motor connected to the control device, and a cam resting on the shaft of this motor, the rod which rests against the rinsing piston bearing against such cam.

4. An arrangement as claimed in claim 1, comprising a replenishing tank, the space of the second hydraulic cylinder for quick advance being connected to the replenishing tank when the piston of such second cylinder is in its idle position.

* * * * *